US012617169B2

(12) United States Patent
Kyttanen et al.

(10) Patent No.: US 12,617,169 B2
(45) Date of Patent: May 5, 2026

(54) PROCESS FOR MANUFACTURING A FOOTWEAR AND FOOTWEAR PARTS

(71) Applicant: WHAT THE FUTURE B.V., Amsterdam (NL)

(72) Inventors: Janne Tuomas Kyttanen, West Hollywood, CA (US); Liam Edward Proctor, Oudeschild (NL)

(73) Assignee: WHAT THE FUTURE B.V., Amsterdam (NL)

( * ) Notice: Subject to any disclaimer, the term of this patent is extended or adjusted under 35 U.S.C. 154(b) by 850 days.

(21) Appl. No.: 17/431,523

(22) PCT Filed: Feb. 17, 2020

(86) PCT No.: PCT/EP2020/054092

§ 371 (c)(1),
(2) Date: Aug. 17, 2021

(87) PCT Pub. No.: WO2020/169527

PCT Pub. Date: Aug. 27, 2020

(65) Prior Publication Data

US 2022/0132989 A1 May 5, 2022

Related U.S. Application Data

(60) Provisional application No. 62/807,263, filed on Feb. 19, 2019.

(30) Foreign Application Priority Data

Mar. 11, 2019 (NL) ...................................... 2022712

(51) Int. Cl.
*B29D 35/12* (2010.01)
*B29D 35/04* (2010.01)
(Continued)

(52) U.S. Cl.
CPC ........... *B29D 35/04* (2013.01); *B29D 35/122* (2013.01); *B29D 35/142* (2013.01); *B33Y 80/00* (2014.12)

(58) Field of Classification Search
CPC .......................... B29D 35/122; B29D 35/142; B29D 35/0018; B29D 35/0063
See application file for complete search history.

(56) References Cited

U.S. PATENT DOCUMENTS 4,703,533 A 11/1987 Barma
5,346,934 A * 9/1994 Chriss ..................... C08L 21/00
524/11
(Continued)

FOREIGN PATENT DOCUMENTS

CN 1715032 A 1/2006
CN 106881792 A 6/2017
(Continued)

OTHER PUBLICATIONS

International Search Report and Written Opinion for PCT/EP2020/054092; May 12, 2020; 13 pgs.

*Primary Examiner* — Alison L Hindenlang
*Assistant Examiner* — Alexander A Wang
(74) *Attorney, Agent, or Firm* — Perilla Knox & Hildebrandt LLP

(57) ABSTRACT

The invention is directed to a process for producing a outsole or inner sole of a footwear comprising the following steps (a) providing a first form negative mould of the outsole or inner sole comprising of at least one formed plastic sheet as obtained by thermoforming using a first master mould corresponding with the shape of a first side of the outsole or inner sole, (b) adding a liquid curable composition to the first form negative mould, and (c) solidifying the curable composition wherein a solidified outsole or inner sole is (Continued)

obtained and wherein the first form negative mould is removed from the solidified outsole or inner sole.

21 Claims, 4 Drawing Sheets

(51) Int. Cl.
  B29D 35/14        (2010.01)
  B33Y 80/00        (2015.01)

(56)                References Cited

U.S. PATENT DOCUMENTS

| | | | | |
|---|---|---|---|---|
| 5,368,793 | A | * | 11/1994 | Lau ......................... B29C 33/34 |
| | | | | 264/328.11 |
| 6,749,781 | B1 | | 6/2004 | Maurer |
| 2005/0285302 | A1 | | 12/2005 | Doerer et al. |
| 2006/0273496 | A1 | * | 12/2006 | Chen ...................... A43B 13/20 |
| | | | | 264/259 |
| 2010/0064548 | A1 | | 3/2010 | Hansen |
| 2014/0066530 | A1 | | 3/2014 | Shen et al. |
| 2016/0302508 | A1 | | 10/2016 | Kormann et al. |
| 2018/0085972 | A1 | | 3/2018 | Kyttanen et al. |
| 2018/0207839 | A1 | * | 7/2018 | Isse ..................... B29C 33/3842 |
| 2018/0229461 | A1 | | 8/2018 | Sermpongs |
| 2018/0354188 | A1 | * | 12/2018 | Teramoto .............. B29C 51/165 |
| 2019/0091895 | A1 | * | 3/2019 | Knappworst ........ A43B 13/223 |
| 2022/0073223 | A1 | | 3/2022 | Aufenast |
| 2022/0097289 | A1 | | 3/2022 | Aufenast |

FOREIGN PATENT DOCUMENTS

| | | | |
|---|---|---|---|
| EP | 1872924 | A1 | 1/2008 |
| WO | 2016186837 | A1 | 11/2016 |
| WO | 2018200360 | A1 | 11/2018 |

* cited by examiner

PROCESS FOR MANUFACTURING A FOOTWEAR AND FOOTWEAR PARTS

The invention is directed to a process for manufacturing a footwear and footwear parts.

Footwear, hereafter referred to as a shoe, normally include both an upper and sole structure. The upper generally forms an interior void that securely and comfortably receives a foot. The sole structure may be secured to the upper and is generally positioned between the foot and the ground. This sole structure may attenuate ground reaction forces, provide traction, as well as limit potentially harmful foot motion. Accordingly, the upper and sole structure operate together to provide a comfortable structure that is well suited for use in a wide variety of activities.

The sole structure may comprise multiple layers that are conventionally referred to as an inner sole, a midsole, and an outsole. The insole is a thin, compressible member located within the void of the upper and adjacent to the midsole and the foot in order to enhance comfort. The midsole may be secured to the upper and forms a middle layer in the sole structure that attenuates the ground reaction forces. The outsole forms the element of the sole structure that makes contact with the ground and is usually fashioned from a durable and wear-resistant elastomeric material that may include a tread pattern to impart traction.

US2018/0229461 describes a process to form a footwear article by forming a rubber outsole component by cutting the outsole component into the plurality of rubber outsoles from a sheet.

US2010/0064548 describes the manufacture of a footwear having an upper and an outsole with an upraised portion. The method uses a mould comprising a last, upon which the upper is arranged, an upper mould part divided into two side parts being laterally movable in relation to a lower mould part between a first and second position, and the lower mould part being vertically movable in relation to the upper mould part between a third and fourth position. The material for the footwear is injected into said mould.

WO2016/186837 describes a method to bond a shoe sole bonded with a shoe upper using an adhesive particulate is selectively fused to the substrate with a laser array.

EP1872924 describes a method to make a foam-molded article such as a shoe by injecting 1, 2-polybutadiene into a mould. The curing takes place in the mould.

WO18200360 describes a process to manufacture a footwear product wherein the outsole is made from a UV radiation cured material. Such a UV radiation cured material requires a certain minimum mould time to fully cure. When producing high numbers of footwear a large number of moulds will then be required. Furthermore for one footwear design differently shaped moulds are required in order to manufacture footwear for differently sized feet. Such moulds are typically metal parts which have been shaped by subtractive manufacturing such as machining a metal starting body. Thus this method of manufacture requires numerous complex moulds.

The object of the present invention is to provide a simpler process which can manufacture footwear parts and even the entire footwear. More especially the object is to provide a manufacturing process which does not require numerous metal moulds.

SUMMARY

This object is achieved by the following process. Process for producing a outsole or inner sole of a footwear comprising the following steps (a) providing a first form negative mould of the outsole or inner sole comprising of at least one formed plastic sheet as obtained by thermoforming using a first master mould corresponding with the shape of a first side of the outsole or inner sole, (b) adding a liquid curable composition to the first form negative mould, and (c) solidifying the curable composition in the form negative mould wherein a solidified outsole or inner sole is obtained.

This process is advantageous because the curing takes place in a relatively easily obtainable form negative mould made of a plastic sheet material. Such moulds may be manufactured in high numbers by thermoforming. This process requires only one or a limited number of relatively complex master moulds as compared to the prior art methods which require many of such moulds as explained above. The time consuming curing in step (c) thus takes place in a disposable form negative mould made of a plastic material which can be removed from the outsole or inner sole. Thus a higher production capacity is obtained without having to manufacture more master moulds as in the prior art processes. The removed plastic mould may be recycled for reuse in the process. Further advantages will be described when discussing the invention in more detail below.

In this description terms as above, below, upper, bottom and lower may be used. These terms are used to more clearly illustrate the invention as it would be generally applied. For example for footwear the terms are used for the orientation at which the footwear is generally used wherein the outsole is the bottom and an upper is typically the upper end of the footwear. Terms like first, second etc do not indicate any process sequence unless specified. These terms do not limit the invention to this general application.

In step (a) a form negative mould of the outsole or inner sole comprising of a plastic sheet is provided. The mould may comprise of only one formed plastic sheet leaving an open side. When the liquid curable composition is added in step (b) it is preferably added from above while the formed end of the mould faces downwards. In this way the liquid curable composition remains within the mould. Such a mould may be suitably used to make an outsole or inner sole having a flat surface at one side. Midsoles may also be made by this process. After performing step (b) a planar sheet is suitably placed on top of the liquid curable composition.

After performing step (b) a second form negative mould of the outsole or inner sole may suitably be placed on top of the liquid curable composition. This is advantageous because a shaped bottom and a shaped upper side may be obtained for the outsole or the inner sole. Step (c) will then be performed while the curable composition is present between first and second form negative moulds thereby obtained a shaped outsole or inner sole. The second form negative mould of the outsole or inner sole suitably comprises of at least one formed plastic sheet as obtained by thermoforming using a second master mould corresponding with the shape of a second side the outsole or inner sole. This second side may be the upper side of the outsole or inner sole or the upper side of a layer of material of the outsole or inner sole as will be explained below in more detail.

The first and second form negative moulds may be connected to each other or pressed together by means of a press or by means of a support discussed below. In one embodiment the first and second form negative moulds may be sealed together to obtain a packaging for the cured product. The packaged outsole and especially the inner sole may thus be transported another location or offered as a product per se.

With the process of this invention it is also possible to produce layered outsole or layered inner sole products. With layered is here meant that the different layers are stacked on top of each other and the material and/or properties of the adjacent layers is different. Suitably an outsole or inner sole is produced wherein during step (c) a further layer of a different liquid curable composition is added on top of the partly cured curable composition. Step (c) is hereby performed while the partly cured curable composition is present in the first form negative mould. Any optional planar sheet or a second form negative mould is first removed prior to adding the different liquid curable composition.

The further layer as added to the base layer as described above. The further layer may be covered by a planar sheet or by a fourth form negative mould. This fourth form negative mould is suitably a formed plastic sheet as obtained by thermoforming using a fourth master mould corresponding with the shape of an upper side this next layer.

The process of adding a further layer may be repeated to obtain multi-layered outsoles, midsoles and inner soles.

The first form negative mould may also be combined with a third form negative mould to obtain a full mould of the outsole or inner sole before performing step (b). To this full mould the liquid curable composition is added in step (b) via a gating opening. Preferably the third form negative mould comprises of at least one formed plastic sheet as obtained by thermoforming using a third master mould corresponding with the shape of a second side the outsole or inner sole.

In step (b) the first form negative mould is suitably supported by the first master mould or by an equally shaped support. In a continuous process it may be preferred to use an equally shaped support such that the master mould may be used to produce a next first form negative mould or a next group of first form negative moulds. By equally shaped supports will have the same shaped surface as the master mould. This results in that the shaped surfaces of the first form negative mould is equally supported along its surface by the support.

The planar sheet or the second form negative mould as described above may also be supported by a support. This is advantageous to ensure that the outsole or inner sole obtains it desired shape in step (c). This support may be a flat plate in case a planar sheet requires support or the second master mould. Preferably this support is an equally shaped support or more preferably a form negatively shaped support as compared to the second master mould.

The above described supports may be cooled while performing step (b). This is especially advantageous when the temperature of the liquid curable composition added in step (b) is higher than the softening point of the formed plastic sheet of the first form negative mould. The supports may also be heated to enhance a polymerisation reaction as described below. Heating or cooling may be achieved by for example air or water cooling at the side of the support not facing the form negative moulds.

In step (c) the curing of the curable composition or compositions may be performed while the form negative mould is supported as described above. Because curing may take some time before a fully cured product is obtained it is preferred that the supports are removed from the mould when the curable composition has achieved a substantially stable shape. The products may then be removed in step (c) from their supports and be stored elsewhere to fully cure while present within their form negative mould. This is especially advantageous when for example the shape stable product is obtained quickly, like for example within minutes to an hour and when a fully cured product is obtained after 24 hours. The fully cured or solidified outsole or inner sole as obtained is removed from the first form negative mould and optional further third form negative mould to obtain the product for use as part of a footwear.

The formed plastic sheets are obtained by thermoforming. Thermoforming is a manufacturing process where a plastic sheet is heated to a pliable forming temperature and formed to a specific shape in a master mould. The sheet is heated to a high-enough temperature that permits it to be stretched into or onto a mould and cooled to a finished shape. When the mould comprises two formed plastic sheets it may be preferred that these are manufactured by thermoforming and subsequently interconnected.

The plastic sheet may be any type of plastic and especially plastics suitable for thermoforming. The plastic sheet should not be an obstruction for radiation when for example radiation curable composition is used as the liquid curable composition. For this reason light transparent sheets are preferably used when the radiation is visible light or ultraviolet radiation. When the radiation is for example microwave it is preferred to used plastic sheets which do not cause dielectric heating of the plastic sheet itself. The material for the plastic sheet is preferably strong at a minimum sheet thickness. The plastic is suitably a thermoplastic polymer. Examples of suitable thermoplastic polymers are polyethylene, polypropylene, polycarbonate and preferably polystyrene. The thickness of the sheet may vary from 50 microns to even 5 mm, wherein the lower part of the range may be used to make smaller products and the upper end of the range may be used to make larger products. For example, for making products having a maximum dimension of less than 50 cm the thickness of the sheet may vary between 50 and 200 microns.

The first master mould, second master mould, third master mould and/or fourth master mould used in the thermoforming process may be obtained by 3D printing or by subtractive manufacturing. Subtractive manufacturing, like machining a suitably metal body, may be performed making use of for example computer numerical control machining.

The above described equally shaped supports used in the step (b) and/or step (c) may also be obtained by 3D printing or by subtractive manufacturing described hereabove.

Preferably the above referred to master mould, the second to fourth master moulds and/or the above referred to supports are obtained by 3D printing because this enables one to manufacture different footwear designs without having to make master mould using laborious techniques like machining. The 3D printing of these items allows one to develop new designs for outsoles, inner soles and complete footwear much easier. The master mould or moulds and the optional shaped supports may be used to quickly produce a small number of prototypes. If the new design is to be produced in larger numbers the same moulds and supports may also be used for the large scale production.

A number of 3-D printing technologies will be available to the skilled addressee, printing in a range of materials including plaster, thermoplastics, photopolymerised polymers, or thermally-sintered materials. Specific examples of suitable materials and additive manufacturing techniques are ABS Plastic manufactured using Fused Deposition Modelling FDM, Selectively Laser Sintered SLS Nylon and Selectively Laser Sintered SLS Alumide®. Suitable printers are for example FDM 3D printers made by Ultimaker, SLS Printers, for example the ProX SLS 6100 made by 3D Systems and MJF Printers made by HP thermoplastics.

When the master mould is made by 3D printing using a material having a low thermal conductivity as described above it is preferred that the master mould is provided with a number of openings which fluidly connect the shaped surface of the master mould facing the form negative mould of the 3D product and its opposite side. The thickness of the master mould is preferably between 0.5 and 5 mm. The holes are typically less than 2 mm in diameter, and preferably less than 1 mm in diameter. The openings allow air to escape through the master mould during the forming process. The master mould is further suitably provided with channels for passage of a fluid cooling medium along the above referred to opposite side of the shaped surface. Cooling of the master mould enhances the produced form negative mould of the 3D product to solidify into its desired shape in the master mould. A fluid cooling medium may be a gas, like for example air, or a liquid, like for example water or a specific heat transfer fluid, like ethylene glycol or propylene glycol. T Thermoforming is suitably performed using a thermoforming packaging machine in a continuous process. Such Thermoforming packaging machines are well known. Such machines enables one to prepare numerous moulds in a continuous process starting from a roll of sheet or from an extruder providing a sheet. Such a thermoforming packaging machine may comprise of one or two thermoforming stations, an optional sealing station, a filling station, wherein the curable composition is added, and a cutting station. When a second form negative mould is produced by thermoforming it is preferred to have two thermoforming stations. The first thermoforming station using the first master mould and the second thermoforming station using the second master mould. In the cutting station single moulds may be obtained or groups of inter connected moulds. The cutting station may be upstream the filling station or downstream the filling station. The single moulds or groups of moulds containing the curable composition may be stored for allowing the curable composition to cure.

In step (b) a liquid curable composition is added to the mould. Adding the liquid curable composition may be performed by pouring the composition into the mould like for example known from an open pour moulding process. Pouring may be performed by adding the composition from above into the mould, for example into an open upper end of a simple one sheet mould or via a gating opening of a full mould as described above.

In step (c) all or part of the liquid curable composition as present within the mould is solidified. Curing may take place by reaction and/or may be the result of a phase change. Curing by phase change is suitably achieved with a liquid curable composition comprising a polymer in its molten state. Such a polymer may be scrap or recycle poly-ethylene or polypropylene or their mixtures. By adding these compounds in their liquid molten phase it is possible to re-use these materials and produce useful parts of footwear. The temperature of the molten polymers may be high and/or the polymerisation itself may cause temperature to rise and for these reasons cooling may have to be performed as explained above in step (b) and optionally also in step (c).

The curing reaction is suitably polymerisation of the components of the composition. Polymerisation may be initiated by spontaneous reaction between the components of the composition at the conditions of step (c) optionally in the presence of an initiator compound. Polymerisation may be accelerated by performing step (b) and (c) at a more elevated temperature which may require cooling as described above.

The components of the curable polymerisation composition are suitably mixed to obtain the composition just before performing step (b) or kept at conditions wherein polymerisation does not occur in any significant manner. The conditions for performing step (c) are preferably the ambient conditions mentioned for step (b). Alternatively the polymerisation in step (c) may be initiated under the influence of ultra-sound or radiation through the plastic sheet of the mould. The wavelength of the radiation will depend on the choice of radiation curable composition. Many radiation curable compositions require light in the UV waveband, but some radiation curable compositions cure when visible light is used. Alternatively the radiation may be electromagnetic radiation, for example microwave, radio waves, or infrared.

Because step (c) is performed in the relatively simple plastic moulds it is less important that the curing is quickly achieved because a relatively long time period of the curing may be performed in the relatively simple moulds. This allows one to choose curable compositions which require a longer curing time. For example compositions or radiation curable compositions having a high propagation rate. Radiation curable compositions may for example be exposed to radiation for a starting time period and to a period without radiation when the polymerisation is initiated and propagates in the absence of the radiation.

A preferred curable composition is a so-called cold pour curing composition. The advantage is that no cooling of the moulds as described above is required. Such liquid compositions are well known. They can be formulated just before use and poured into the mould in step (b) at for example ambient conditions and cure into a solid body in step (c) at for example ambient conditions. Examples of suitable cold pour curing compositions are silicone rubber, thermoplastic rubber, natural rubber and suitably polyurethane (PU) and thermoplastic polyurethane (TPU). In case an inner sole is produced the liquid curable composition is preferably a silicone, like silicone rubber or a thermoplastic rubber. In case an outsole is produced the liquid curable composition is preferably polyurethane (PU) or thermoplastic polyurethane (TPU).

The above referred to ambient conditions may be between 5 and 50 C, preferably between 10 and 30 C and the pressure may be between 0.08 MPa and 0.12 MPa, more preferably at ambient pressure.

The cold pour curable composition may further comprise of other components. Preferred other components are solid particles, for example added to adjust the density of the prepared product or to alter other properties, like compressibility. Applicants found that the cold pour curing composition can be combined with cork particles, particles of injected moulded thermoplastic polyurethane (TPU), injected moulded polyamide (PA), injected moulded polyethylene terephthalate (PET), injected moulded ethyl vinyl acetates(EVA) and/or injected molded polybutylene terephthalate (PBT). These particles may be advantageously be obtained in a process of footwear manufacturing as for example described in US2014066530. Even more advantageously these particles may be obtained from used footwear. US2016302508 describes an illustrative footwear made from only one of the listed materials. This enables one to recover the material of one type in a simple manner. This recovered material may be advantageously used as part of the curable composition as used in step (b) as regrind material. Suitably the liquid curable composition further comprises regrind injection moulded EVA foam particles and/or regrind injection moulded PU particles. More preferably a layer of such recovered material may be poured on top of a, for example TPU, outsole, as a midsole according to the process described above.

The invention is also directed to a process to manufacture a footwear comprising the following steps, (i) manufacture of an outsole according to the process according to this invention, (ii) placing an upper on top of the outsole obtained in step (i) and (iii) connecting the upper to the outsole. Preferably in step (i) a further midsole is provided on top of the outsole according to the process described above for the layered products. In step (iii) the upper is then connected to the obtained outsole and midsole. Preferably an inner sole as obtained by the process according to this invention is placed in the footwear obtained in step (iii).

The upper may be any conceivable upper which can be combined with the outsole as described above. The choice of upper depends on the type of footwear one desires to make. Examples of possible footwear are shoes, boots, sandals and the like. The upper can be of any material such as number of suitable materials including, for example, leather, textile, synthetic (nonwoven and microfiber backed), microfiber, spacer meshes, plastic, rubber, wood, natural fibers such as jute and the like. Specific materials include EPM synthetic suede, leather, EPM synthetic leather, poly-nylon non-woven, microfiber polyester textile, polyester textile or TPU coated synthetic leather. The upper can be open toed or closed toed. Similarly, the heel of the upper can be open heeled or closed heeled. The upper may also be obtained by a thermoforming process. Suitable materials for such an upper obtained by thermoforming may ne any sheet material which can be shaped in a thermoforming process. Examples are ethyl vinyl acetates (EVA) foams, leather, thermoplastic fiberglass composites, thermoplastic carbon fiber composites, knitted nylon fibers, airmesh PVC and airmesh polyester.

The upper may be connected to the outsole and inner sole by any well known process. Suitably the connecting in step (iv) is at least one of gluing, welding, high frequency welding, ultrasonic welding, laser welding, pressing, sewing, screwing, riveting, melting together, clipping together, sealing, subjecting to a heat and pressure treatment, or subjecting to a steaming treatment.

BRIEF DESCRIPTION OF THE DRAWING FIGURES

Many aspects fo the present disclosure can be better understood with reference to the following drawings. The components in the drawings are not necessarily to scale, with emphasis instead being placed upon clearly illustrating the principl of the disclosure. Moreover, in the drawings, like reference numerals designae corresponding parts throughout the several views.

Figure 1:
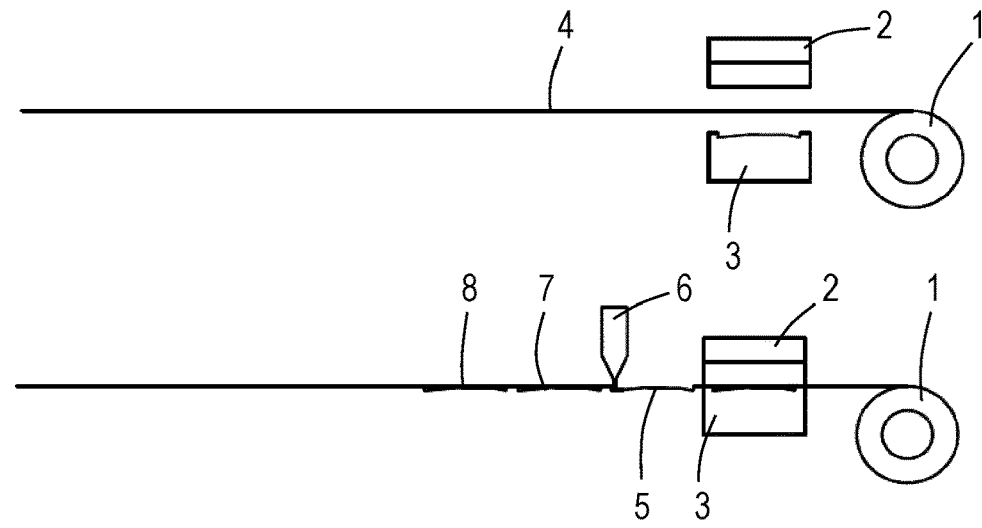
FIG. 1 shows a schematic representation of a possible continuous process to manufacture an outsole for a footwear.

The invention will be illustrated by FIG. 1. FIG. 1 is a schematic representation of a possible continuous process to manufacture an outsole for a footwear. In the upper drawing of FIG. 1*a* roll (1) is shown from which a plastic sheet (4) runs to the left hand of the figure. The sheet (4) runs between an upper tooling part (2) and a lower tooling part (3) of a thermoforming forming station. The lower tooling part (3) comprises a master mould at its upper side. In the lower figure upper and lower tooling parts sandwich the plastic sheet (4) resulting in that a form negative mould (5) of the outsole is obtained. This mould (5) is filled with a liquid curable composition from container (6). The mould with the curing composition is shown as filled mould (7). The mould with the fully cured composition is shown as mould (8). The outsole (7*a*) may be separated from the mould or remain in the mould to be combined with other footwear parts as shown in FIG. 3.

Figure 2:
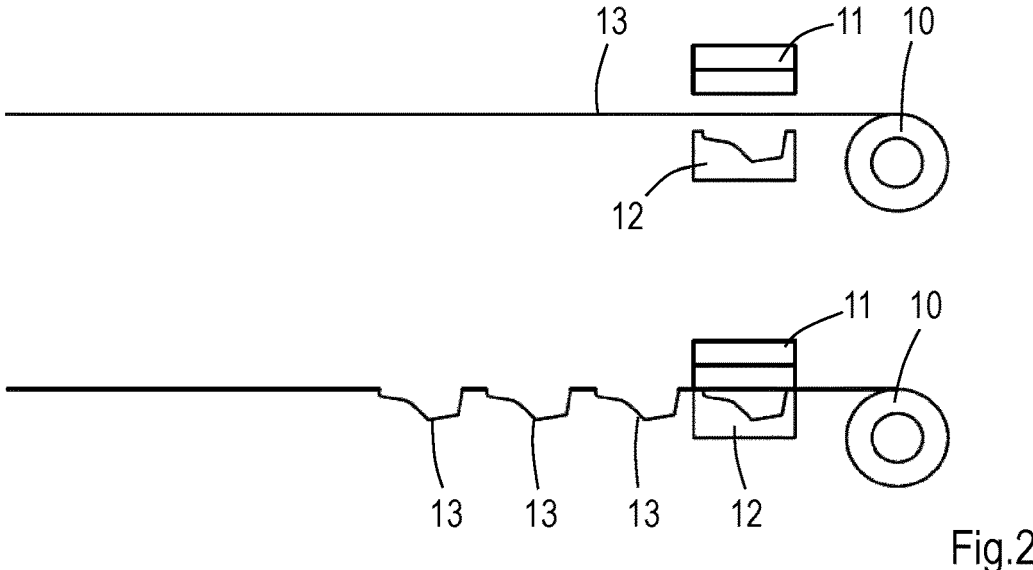
FIG. 2 shows a roll stock thermoforming process to make an upper.

FIG. 2 shows a well known roll stock thermoforming process to make an upper. From roll (10) a sheet (13) of for example EVA foam is drawn to the left. The sheet (13) runs between an upper tooling part (11) and a lower tooling part (12) of a thermoforming forming station. The lower tooling part (12) comprises a master mould at its upper side. In the lower figure upper and lower tooling parts sandwich the sheet (13) resulting in that an upper (13) is obtained.

Figure 3:
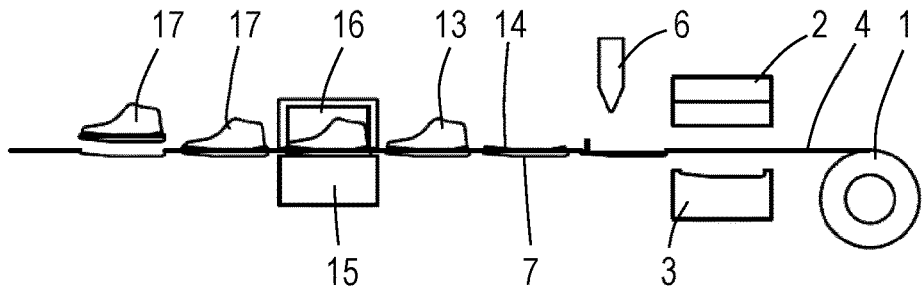
FIG. 3 shows the line-up as in FIG. 1 as part of a footwear manufacturing process.
Figures 4, 5, 6:
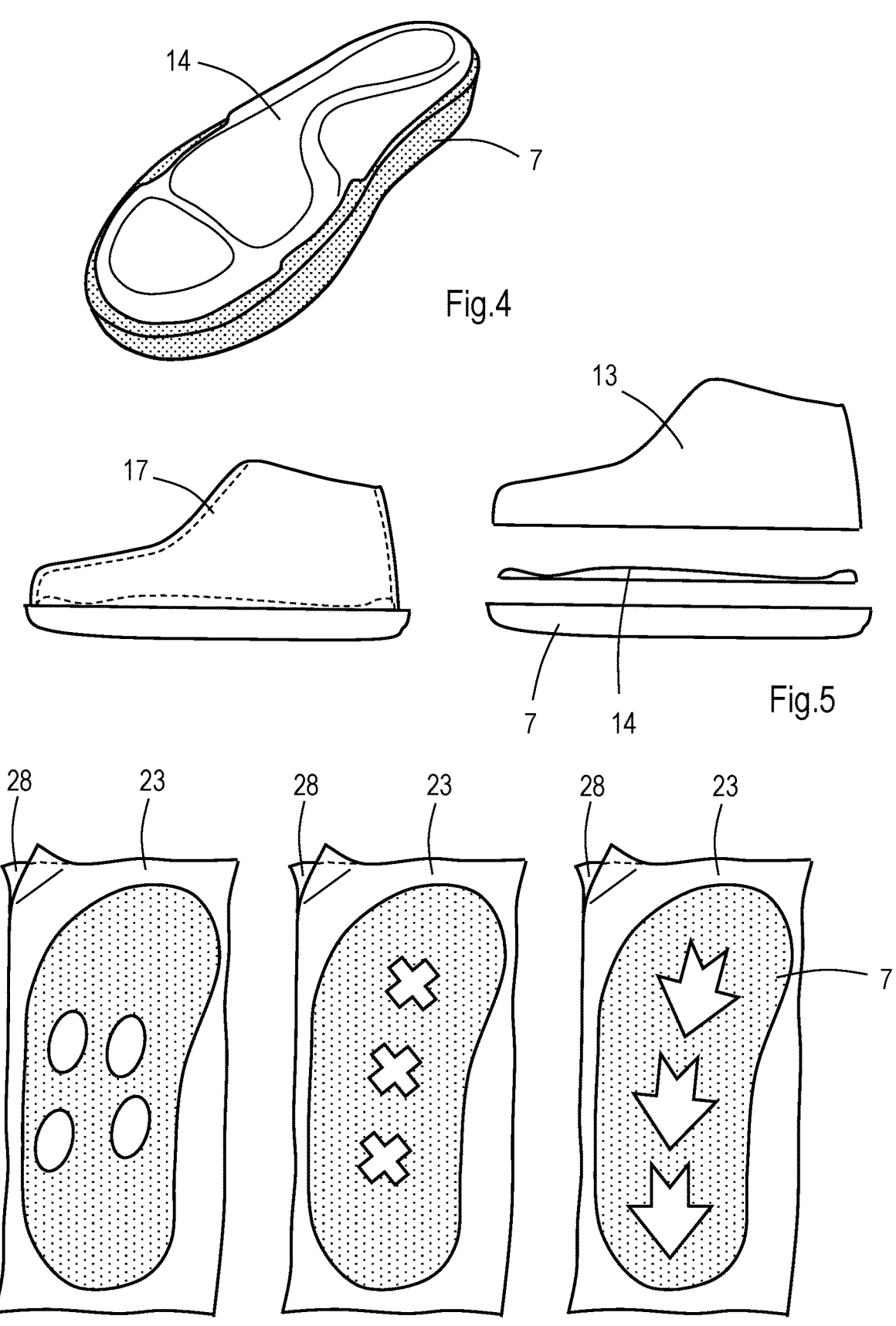
FIG. 4 shows a stack of an outsole and midsole.
FIG. 5 shows an upper and a stack of an outsole and midsole in assembled and exploded view.
FIG. 6 shows different packaged outsoles as sandwiched between a first form negative mould and a second form negative mould.
Figure 7:
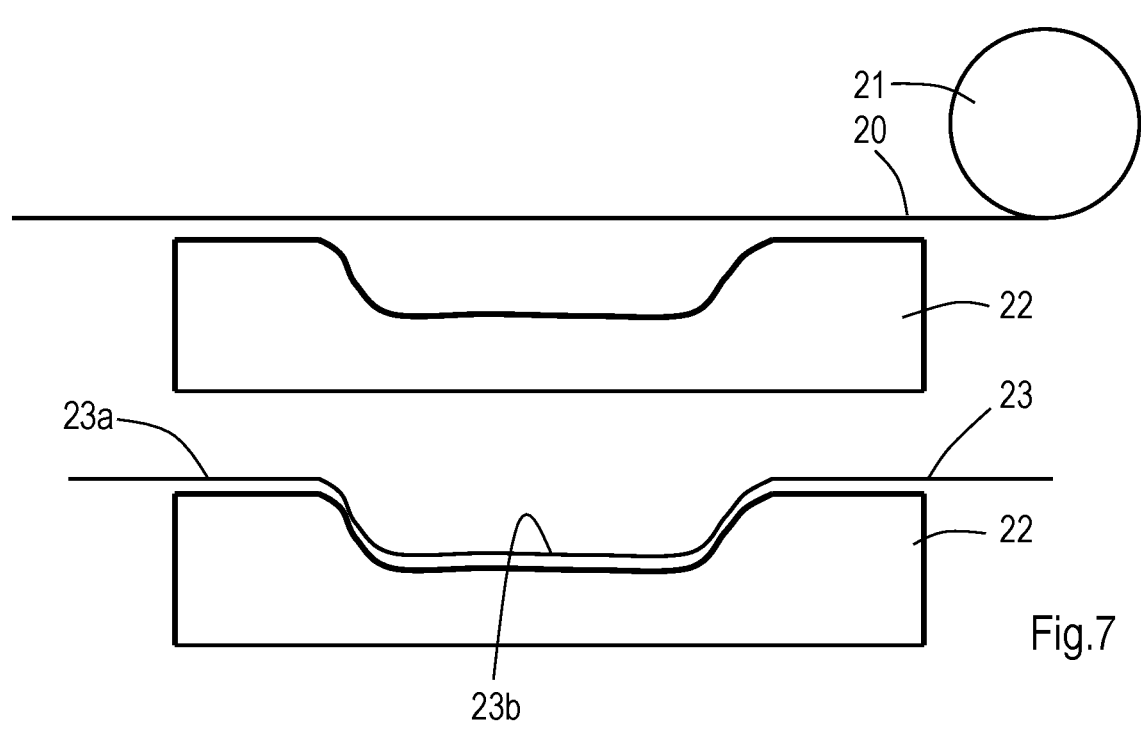
FIG. 7 shows the thermoforming step of the Example to make a first form negative mould.
Figure 8:
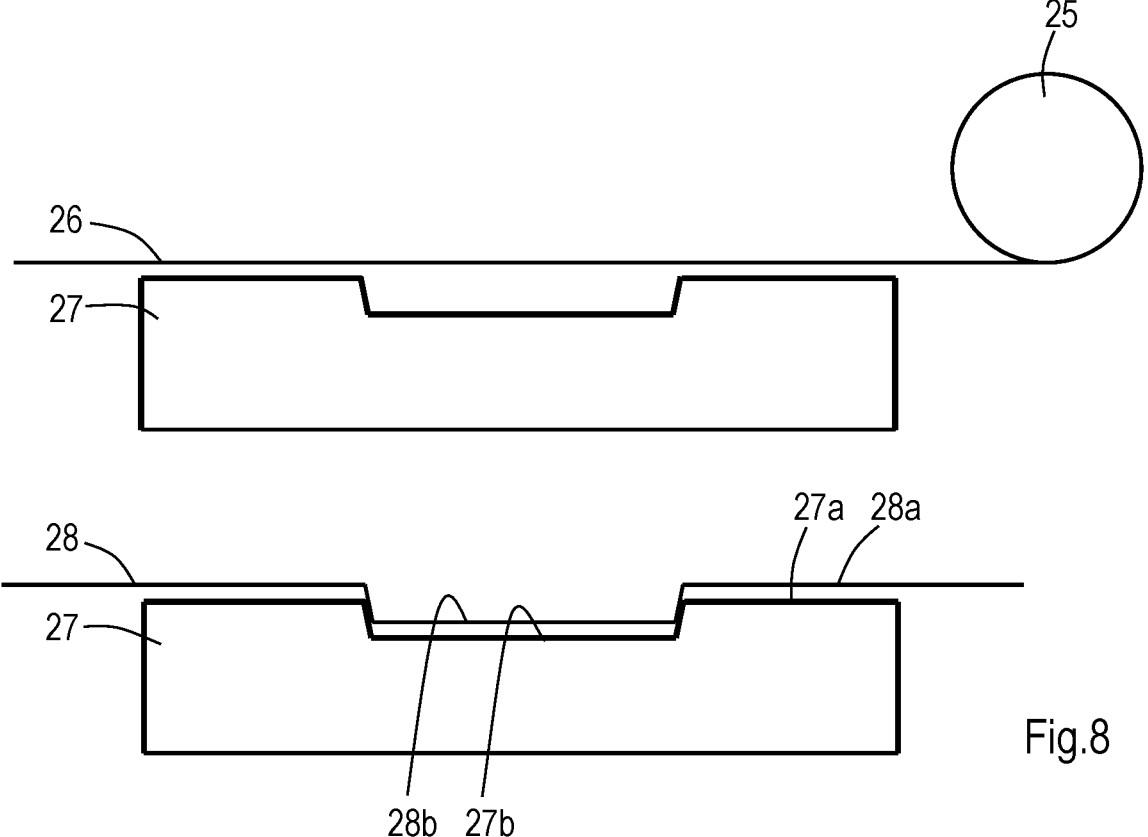
FIG. 8 shows the thermoforming step of the Example to make a second form negative mould.

FIG. 3 shows the line-up as in FIG. 1 as part of a footwear manufacturing process. The mould (8) with the cured outsole (7*a*) is combined with a midsole (14) midsole (14) on top of the outsole (7*a*). The outsole (7*a*) does not have to be fully cured when the midsole (14) is fixed on to the outsole (7*a*). On top of the stack of outsole (7*a*) and midsole (14) as shown in FIG. 4, an upper (13) is placed (see also FIG. 5). The upper (13) may be any upper or one as prepared by the process illustrated in FIG. 2. In a sealing station (15) the upper (13) is connected to the outsole.

FIG. 6 shows different packaged outsoles (7*a*) as sandwiched between a first form negative mould (23) and a second form negative mould (28).

The invention will be further illustrated by the following non-limiting example.

EXAMPLE

In this example reference will be made to FIGS. 7-10 which Figures schematically show the different steps and moulds used in this example. In this example an outsole (29) is prepared according to the process of this invention. A first master mould (22) made of ABS was prepared using Fused deposition modelling (FDM). The master mould (22) was printed in four separate parts and assembled to one piece. The first master mould (22) resembles the form negative shape of the bottom of the outsole (29). The mould (22) is only slightly larger than the exact form negative shape of the desired outsole (29). Also a second master mould (27) was made of ABS using Fused deposition modelling (FDM). Again the second master mould (27) was printed in four separate parts and assembled to one piece. The second master mould (27) resembles the form negative shape of the upper end of the outsole (29) to be prepared. The first and second master mould were prepared within 12 hours. When using quicker and more printers one can imagine that such a process may even be performed in a shorter time span. Using larger printers will enable one to make the first and second mould in one piece by means of 3D printing.

A first form negative mould (23) of the outsole consisting of one formed plastic sheet (21) of a thermoplastic elastomer having a thickness of 0.22 mm was obtained by thermoforming using the above first master mould (22). The mould (23) has a planar surface (23*a*) and a recess (23*b*) within the planar part (23*a*) corresponding with the bottom of the outsole (29) and the sides of the outsole (29).

A second form negative mould (28) of the outsole (29) consisting of one formed plastic sheet (25) of a thermoplastic elastomer having a thickness of 0.22 mm was obtained by thermoforming using the above second master mould (27). The master mould (27) has a planar part (27*a*) and a recess (27*b*) within the planar part (27*a*) corresponding with the upper end of the outsole (29) and part of the sides of the outsole (29).

The first (23) and (28) second form negative moulds were produced at a rate of 6 per minute using a standard thermoforming packaging machine. This could be improved by using more master moulds simultaneously and/or by making use of larger thermoforming packaging machine.

The first form negative mould (23) was placed back into a first support (30) which was equally shaped as the first master mould (22). To the recess (23*b*) of the first form negative mould (23) a cold pour industrial liquid rubber product called PMC-770 as obtained from FormX in Amsterdam, The Netherlands was poured in at room temperature and ambient pressure. The volume (29*a*) added was about the volume of the desired outsole (29). After adding the cold pour curable composition the second form negative mould (28) was placed on top of the filled first form negative mould such that the planar surfaces (23*a*, 28*a*) contact each other and wherein the second form negative mould (28) presses the top surface (29*b*) of the cold pour liquid slightly downwards. Any excess liquid may escape via a purge line (not shown) in one or both planar surfaces (23*a*,28*a*). On top of the second form negative mould (28) a second support (31) is placed and the entire stack as obtained is pressed together. Because the second form negative mould has extensions, namely the recess (28*a*), which penetrate the partly cured liquid (see e.g. FIG. 10) the support (31) is also a form negative of the second master mould (27).

After 15 minutes the first and second supports (30,31) were removed from the stack and after 12 hours the fully cured outsole (29) was removed from the filled set (34) of the two thermoplastic elastomer moulds (23,28). This clearly shows the advantages of this process, namely that the time required to use complex master moulds (22,27) or shaped supports (30,31) in the curing process is relatively short. The longer curing period is performed making use of cheap and disposable thermoplastic elastomer moulds (23, 28). The moulds (23,28) may after use be recycled to a sheet of material which can be reused in the thermoforming process.

Figures 9, 10, 11:
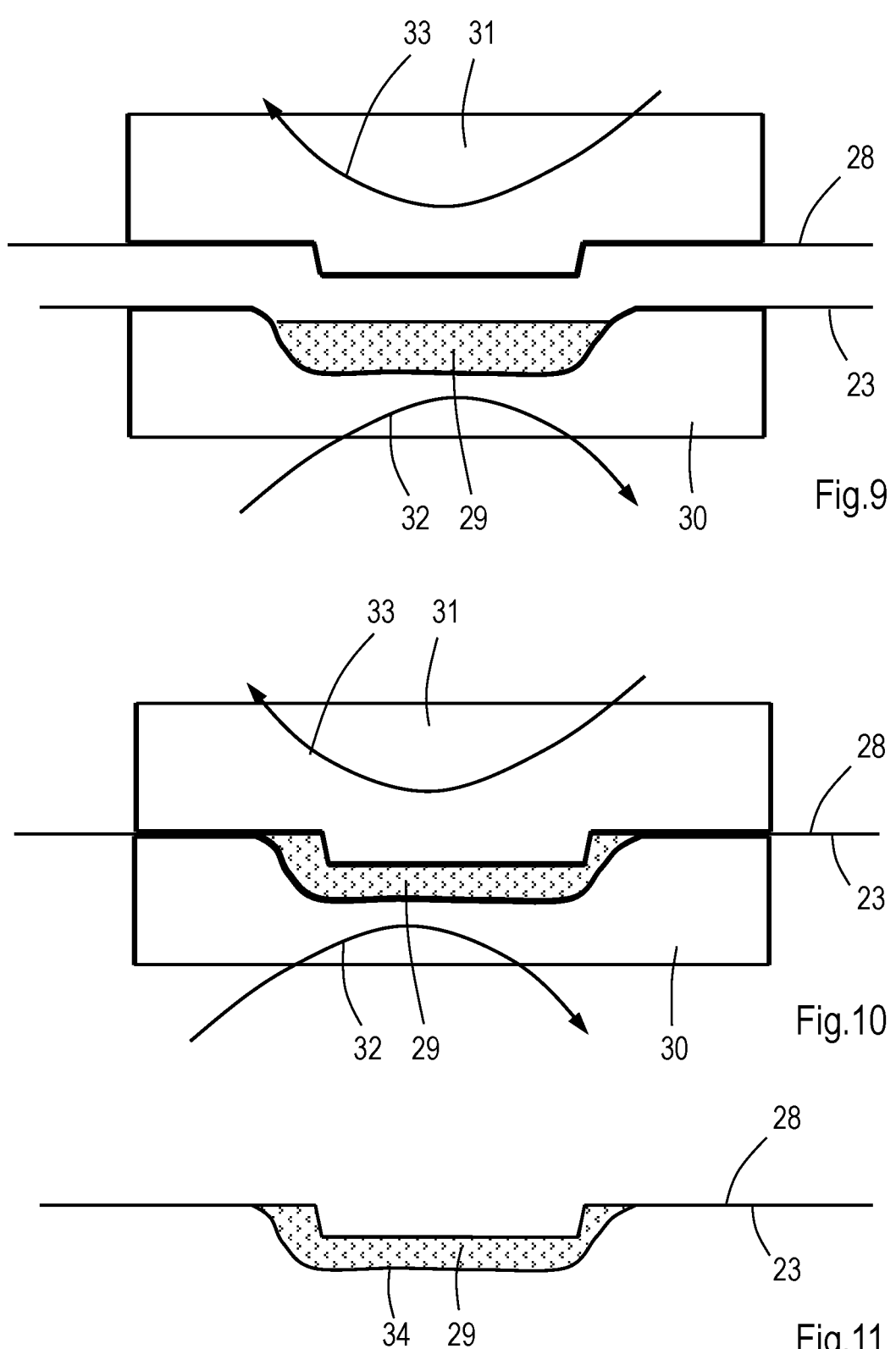
FIG. 9, 10 and 11 shows how first and second form negative moulds are used in the process.

In this example the moulds (22) or supports (30,31) were not cooled or heated. But if required this may be performed by the gas or liquid flows (33,32) as shown in FIGS. 9 and 10. Instead of the above referred to cold pour industrial liquid rubber similar shaped products have been prepared by this method using an urethane rubber PMC-780 WET, urethane rubber PMC-780 DRY and urethane TASK 16 adhesive.

In this example a outsole was prepared having a shaped bottom and upper side. This procedure may also be applied for the manufacture of other objects or multilayer objects.

The invention is thus also directed to a Process for producing any product comprising the following steps (a) providing a first form negative mould of one end of the product comprising of at least one formed plastic sheet as obtained by thermoforming using a first master mould corresponding with the shape of the one end of the product, (b) adding a liquid curable composition to the first form negative mould, (b1) placing a second form negative mould of the other side of the product comprising of at least one formed plastic sheet as obtained by thermoforming on top of the partly cured liquid curable composition and (c) solidifying the curable composition wherein a solidified product is obtained.

Preferred embodiments are those described for the outsole and innersole above.

The invention claimed is:

1. Process for producing an outsole or inner sole of a footwear comprising the following steps:

(a) providing a first form negative mould of the outsole or inner sole comprising of at least one formed plastic sheet as obtained by thermoforming using a first master mould corresponding with the shape of a first side of the outsole or inner sole, (b) adding a liquid curable composition to the first form negative mould, wherein the liquid curable composition is a cold pour composition, and (c) solidifying the curable composition wherein a solidified outsole or inner sole is obtained and wherein in step (c) the solidified outsole or inner sole as obtained is removed from the first form negative mould, wherein the formed plastic sheet of the first form negative mould is obtained by thermoforming using a thermoforming machine comprising of a thermoforming station, a filling station and a cutting station in a continuous process, wherein in the thermoforming station step (a) is performed by preparing numerous first form negative moulds in a continuous process starting from a roll of sheet or from an extruder providing a sheet thereby obtaining a continuous sheet of interconnected first form negative moulds, wherein in the filling station step (b) is performed by adding the liquid curable composition to the first form negative moulds as prepared in the thermoforming station thereby causing the continuous sheet of interconnected first form negative moulds to contain the curable composition, wherein in the cutting station the continuous sheet of interconnected first form negative moulds containing the curable composition is cut into single first form negative moulds containing the curable composition or groups of first form negative moulds containing the curable composition, and wherein step (c) is performed by storing the single first form negative moulds containing the curable composition or the groups of first form negative moulds containing the curable composition as obtained in the cutting station elsewhere from the thermoforming machine.

2. Process according to claim 1, wherein after performing step (b) a second form negative mould of the outsole or inner sole comprising of at least one formed plastic sheet as obtained by thermoforming is placed on top of the liquid curable composition of step (b) that has been partly cured.

3. Process according to claim 2, wherein the formed plastic sheet of the second form negative mould is obtained by thermoforming using a thermoforming packaging machine in a continuous process.

4. Process according to claim 1, wherein in step (a) an outsole or inner sole is produced and wherein during step (c) a further layer of a different liquid curable composition is added on top of the liquid curable composition of step (b) that has been partly cured.

5. Process according to claim 1, wherein in step (a) the first form negative mould is combined with a third form negative mould of the outsole or inner sole comprising of at least one formed plastic sheet as obtained by thermoforming using a third master mould corresponding with the shape of a second side of the outsole or inner sole to obtain a full mould of the outsole or inner sole and that in step (b) the liquid curable composition is added to the full mould via a gating opening.

6. Process according to claim 5, wherein in step (c) the solidified outsole or inner sole as obtained is removed from the first and third form negative mould.

7. Process according to claim 1, wherein the first form negative mould is supported by the first master mould or by an equally shaped support when performing step (b).

8. Process according to claim 7, wherein in step (b) the master mould or the equally shaped support is cooled when the temperature of the liquid curable composition added in step (b) is higher than the softening point of the formed plastic sheet of the first form negative mould.

9. Process according to claim 1, wherein the thermoforming machine is a thermoforming packaging machine.

10. Process according to claim 1, wherein the first master mould of step (a) is obtained by 3D printing.

11. Process according to claim 10, wherein the thickness of the master mould is between 0.5 and 5 mm.

12. Process according to claim 10, wherein the material of the master mould is ABS Plastic manufactured using Fused Deposition Modelling FDM, or Selectively Laser Sintered SLS Nylon.

13. Process according to claim 1, wherein the cold pour curing composition is selected from silicone, rubber, thermoplastic rubber, natural rubber, polyurethane (PU), thermoplastic polyurethane (TPU), and combinations thereof.

14. Process according to claim 13, wherein the cold pour curing composition is liquid TPU or liquid PU.

15. Process according to claim 13, wherein the liquid curable composition further comprises regrind injection moulded EVA foam particles and/or regrind injection moulded PU particles.

16. Process according to claim 1, wherein the liquid curable composition comprises a polymer in its molten state.

17. Process to manufacture a footwear comprising the following steps, (i) manufacture of an outsole according to the process according to claim 1, (ii) placing an upper on top of the outsole obtained in step (i) and (iii) connecting the upper to the outsole.

18. Process according to claim 17, wherein in step (i) a further midsole is provided on top of the outsole according to the process of claim 5 and wherein in step (iii) the upper is connected to the obtained outsole and midsole.

19. Process according to claim 17, wherein an inner sole as obtained by a process according to claim 1 is placed in the footwear obtained in step (iii).

20. Process according to claim 17, wherein the upper is obtained by a thermoforming process.

21. Process according to claim 17, wherein the connecting in step (iii) is at least one of gluing, welding, high frequency welding, ultrasonic welding, laser welding, pressing, sewing, screwing, riveting, melting together, clipping together, sealing, subjecting to a heat and pressure treatment, or subjecting to a steaming treatment.

* * * * *